(12) United States Patent
Wu et al.

(10) Patent No.: US 11,050,196 B2
(45) Date of Patent: Jun. 29, 2021

(54) POWER CABLE CONNECTOR, ELECTRICAL SYSTEM AND METHOD FOR ASSEMBLING POWER CABLE CONNECTOR

(71) Applicant: ABB Schweiz AG, Baden (CH)

(72) Inventors: Fumei Wu, Beijing (CN); Yibo Zhang, Beijing (CN); Qing Yang, Beijing (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/657,065

(22) Filed: Oct. 18, 2019

(65) Prior Publication Data

US 2020/0203896 A1 Jun. 25, 2020

Related U.S. Application Data

(63) Continuation of application No. PCT/CN2018/122411, filed on Dec. 20, 2018.

(51) Int. Cl.
*H01R 13/66* (2006.01)
*H02G 15/08* (2006.01)
(Continued)

(52) U.S. Cl.
CPC ......... *H01R 13/6683* (2013.01); *G01D 21/00* (2013.01); *G01K 1/024* (2013.01);
(Continued)

(58) Field of Classification Search
CPC .... H01R 13/6683; G01D 21/00; G01K 1/024; G01K 13/00; G08C 17/02; H02G 15/08; H04Q 9/00; H04Q 2209/47
See application file for complete search history.

(56) References Cited

U.S. PATENT DOCUMENTS 8,414,326 B2 * 4/2013 Bowman ............ H01R 13/6683
439/488
2009/0170375 A1 * 7/2009 Dayan .................... H01R 31/06
439/650
(Continued)

FOREIGN PATENT DOCUMENTS

CN 102175341 A 9/2011
CN 102570123 A 7/2012
(Continued)

OTHER PUBLICATIONS

Intellectual Property Office of the P.R. China, International Search Report & Written Opinion issued in corresponding Application No. PCT/CN2018/122411, dated Sep. 18, 2019, 9 pp.
(Continued)

*Primary Examiner* — Abdullah A Riyami
*Assistant Examiner* — Nader J Alhawamdeh
(74) *Attorney, Agent, or Firm* — Taft Stettinius & Hollister LLP (57) ABSTRACT

Embodiments of present disclosure relate to a power cable connector, an electrical system and a method for assembling a power cable connector. The power cable connector comprises a housing comprising a first portion adapted to contain a conductive plug inserted therethrough. The power cable connector also comprises a first layer arranged on at least a part of an inner wall of the housing. The power cable connector further comprises a second layer arranged on the first layer so that the first layer is at least partially located between the inner wall of the housing and the second layer. The power cable connector further comprises a passive wireless measuring apparatus embedded into the second layer, wherein in the case that the conductive plug is inserted into the first portion, a surface of the passive wireless measuring apparatus is coupled to the conductive plug. According to embodiments of the present disclosure, the
(Continued)

on-line monitoring of the temperature of the conductive plug can be obtained and the power failure can be detected in advance.

19 Claims, 4 Drawing Sheets

(51) Int. Cl.
  *G08C 17/02* (2006.01)
  *G01K 1/024* (2021.01)
  *G01K 13/00* (2021.01)
  *H04Q 9/00* (2006.01)
  *G01D 21/00* (2006.01)

(52) U.S. Cl.
  CPC ............ *G01K 13/00* (2013.01); *G08C 17/02* (2013.01); *H02G 15/08* (2013.01); *H04Q 9/00* (2013.01); *H04Q 2209/47* (2013.01)

(56) References Cited

U.S. PATENT DOCUMENTS

| | | |
|---|---|---|
| 2011/0077884 A1 | 3/2011 | Bowman |
| 2012/0058676 A1* | 3/2012 | Schaffer .............. H01F 17/0013 439/620.21 |
| 2012/0268290 A1 | 10/2012 | Huang et al. |
| 2016/0226198 A1* | 8/2016 | Hsu .................... H01R 13/7038 |
| 2019/0316969 A1* | 10/2019 | Zhang ................ G06K 7/10366 |

FOREIGN PATENT DOCUMENTS

| | | |
|---|---|---|
| CN | 102790304 A | 11/2012 |
| CN | 203300912 U | 11/2013 |
| CN | 104852169 A | 8/2015 |
| CN | 105353734 A | 2/2016 |
| CN | 106017701 A | 10/2016 |
| CN | 106168511 A | 11/2016 |
| CN | 106197736 A | 12/2016 |
| CN | 106207940 A * | 12/2016 |
| CN | 106207940 A | 12/2016 |
| CN | 106595899 A | 4/2017 |
| CN | 206697617 U | 12/2017 |
| DE | 102015004313 A1 | 10/2016 |
| WO | 2017006360 A1 | 1/2017 |

OTHER PUBLICATIONS

Chinese Patent Office, First Office Action issued in corresponding Application No. 2018800795984, dated Jan. 4, 2021, 21 pp.
Canadian Patent Office, Office Action issued in corresponding Application No. 3,069,475, dated Mar. 23, 2021, 7 pp.

* cited by examiner

POWER CABLE CONNECTOR, ELECTRICAL SYSTEM AND METHOD FOR ASSEMBLING POWER CABLE CONNECTOR

FIELD

Example embodiments of the present disclosure generally relate to temperature measurement and more particularly, to a power cable connector, an electrical system and a method for assembling power cable connector.

BACKGROUND

In medium/high voltage power distribution systems, a power cable connector is used to connect medium-voltage/high-voltage conductors with one another. The power cable connector is also referred as power cable joint, power cable accessory, power cable termination, power cable head or insulating plug. Some variable in relation to the power cable connector may incur failure of the power cable connector on site. For example, the temperature of conductors of power cables may increase as currents carried by the power cables increase. As a consequence, the conductor of the power cable connector connecting the power cables normally will overheat in the first place and the fault may firstly appears at this weak point. Thus, measuring the temperature in relation to the power cable connector becomes necessary.

Traditionally, the sensors to measure the temperature of the conductor are set in the power cable connector. For example, CN 106595899A describes a cable connector which comprises a sensor fixed between the screw nut and insulating plug metal insert. CN 106207940A describes a cable connector which comprises a sensor fixed at some locations. The mentioned locations include a closed end of metal insert or a surface of screw nut.

However, in these approaches, the sensors are placed directly in the power cable connector and the integration methods for sensor and cable accessories are integrated directly. As a result, the thermal conductive effect on the interface of them is not good enough, which leads to the temperature difference between the real temperature and the output temperature.

SUMMARY

Example embodiments of the present disclosure propose a solution for measuring temperature of the power cable connector in an electrical device such as switchgear.

In a first aspect, example embodiments of the present disclosure provide a power cable connector. The power cable connector comprises a housing comprising a first portion adapted to contain a conductive plug inserted therethrough. The power cable connector also comprises a first layer arranged on at least a part of an inner wall of the housing. The power cable connector further comprises a second layer arranged on the first layer so that the first layer is at least partially located between the inner wall of the housing and the second layer. The power cable connector further comprises a passive wireless measuring apparatus embedded into the second layer, wherein in the case that the conductive plug is inserted into the first portion, a surface of the passive wireless measuring apparatus is coupled to the conductive plug.

According to embodiments of the present disclosure, the on-line temperature of the power cable connector can be measured accurately and effectively, thereby improving the reliability and safety of the power cable connector.

In some embodiments, the conductive plug comprises a plate portion and a cylindrical portion, a first thickness T of the plate portion being less than the first diameter D of the cylindrical portion to form a shoulder on an end of the cylindrical portion adjacent to the plate portion, wherein the passive wireless measuring apparatus is arranged on the shoulder. In this way, the passive wireless measuring apparatus can be securely arranged inside the power cable connector, which leads to reliable measurement of the temperature of the conductive plug.

In some embodiments, the passive wireless measuring apparatus is directly coupled to the second layer, or the passive wireless measuring apparatus is coupled to the second layer via a semi-conductive material. In this way, the possibility of partial discharge can be reduced.

In some embodiments, the surface of the passive wireless measuring apparatus is directly coupled to the conductive plug, or the surface of the passive wireless measuring apparatus is coupled to the conductive plug by a thermal conductive material. In this way, a precise measurement of the conductive plug may be achieved.

In some embodiments, the semi-conductive material is selected from a group consisting of EPDM rubber, silicone rubber, acrylic resin, epoxy resin and combination thereof.

In some embodiments, the thermal conductive material is selected from a group consisting of EPDM rubber, silicone rubber, acrylic resin, epoxy resin and combination thereof.

In some embodiments, the power cable connector further comprising: a further passive wireless measuring apparatus embedded into the second layer. In this way, a more accurate measurement of the temperature of the conductive plug may be obtained.

In some embodiments, the conductive plug comprises an opening at an end thereof for receiving a conductor. In this way, the conductor may be easily coupled to the conductive plug and its temperature may be conveniently measured.

In some embodiments, the housing is made of a semi-conductive material. In this way, it can be ensured that the housing is in grounded state.

In some embodiments, the first layer is made of an insulation material. In this way, a fine insulation performance may be achieved.

In some embodiments, the second layer is made of a semi-conductive material. In this way, the electric field stress may be effectively controlled.

In some embodiments, the conductive plug is made of metal. In this way, a better conductivity may be ensured.

In some embodiments, the power cable connector further comprises a second portion, wherein the first portion comprises an end connected to the second portion so that the first and second portions form a "T" shape.

In some embodiments, the passive wireless measuring apparatus comprises a radio frequency identification (RFID) tag. In this way, the temperature of the conductive plug 103 can be obtained in a reliable manner.

In a second aspect, example embodiments of the present disclosure provide an electric system. The electric system comprises a power cable connector of the first aspect, a first antenna; and a reader coupled to the first antenna, wherein the reader is configured to provide wireless radio frequency energy to power the passive wireless measuring apparatus in the power cable connector and receiving temperature data via the first antenna.

In some embodiments, the power cable connector is configured to fit into a basic insulating plug of a switchgear.

In some embodiments, the electric system further comprises a further power cable connector of the first aspect.

In some embodiments, the electric system further comprises a second antenna coupled to the reader, and configured to match an antenna of the further power cable connector.

In a third aspect, example embodiments of the present disclosure provide an Internet of Things (IoT) system. The IoT system comprises a power cable connector of the first aspect.

In a fourth aspect, example embodiments of the present disclosure provide a method for assembling a power cable connector. The method comprises providing a housing comprising a first portion adapted to contain a conductive plug inserted therethrough; arranging a first layer on at least a part of an inner wall of the housing; arranging a second layer on the first layer so that the first layer is at least partially located between the inner wall of the housing and the second layer; and embedding a passive wireless measuring apparatus into the second layer, wherein in the case that the conductive plug is inserted into the first portion, a surface of the passive wireless measuring apparatus is coupled to the conductive plug.

According to embodiments of the present disclosure, the safety of the electrical device such as switchgear in which the power cable connector is used may be ensured. Accordingly, temperature measurement for the power cable connector can conducted appropriately in a reliable and efficient way.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or corresponding reference symbols refer to the same or corresponding parts.

DETAILED DESCRIPTION

The subject matter described herein will now be discussed with reference to several example embodiments. These embodiments are discussed only for the purpose of enabling those skilled persons in the art to better understand and thus implement the subject matter described herein, rather than suggesting any limitations on the scope of the subject matter.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment."

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the Figures. Other definitions, explicit and implicit, may be included below.

As mentioned above, temperature of conductors in an electrical device, such as switchgear, need to be monitored so as to ensure safety and power quality of the electrical device.

Some example embodiments of the present disclosure are described below with respect to FIGS. 1-4.

Figure 1:
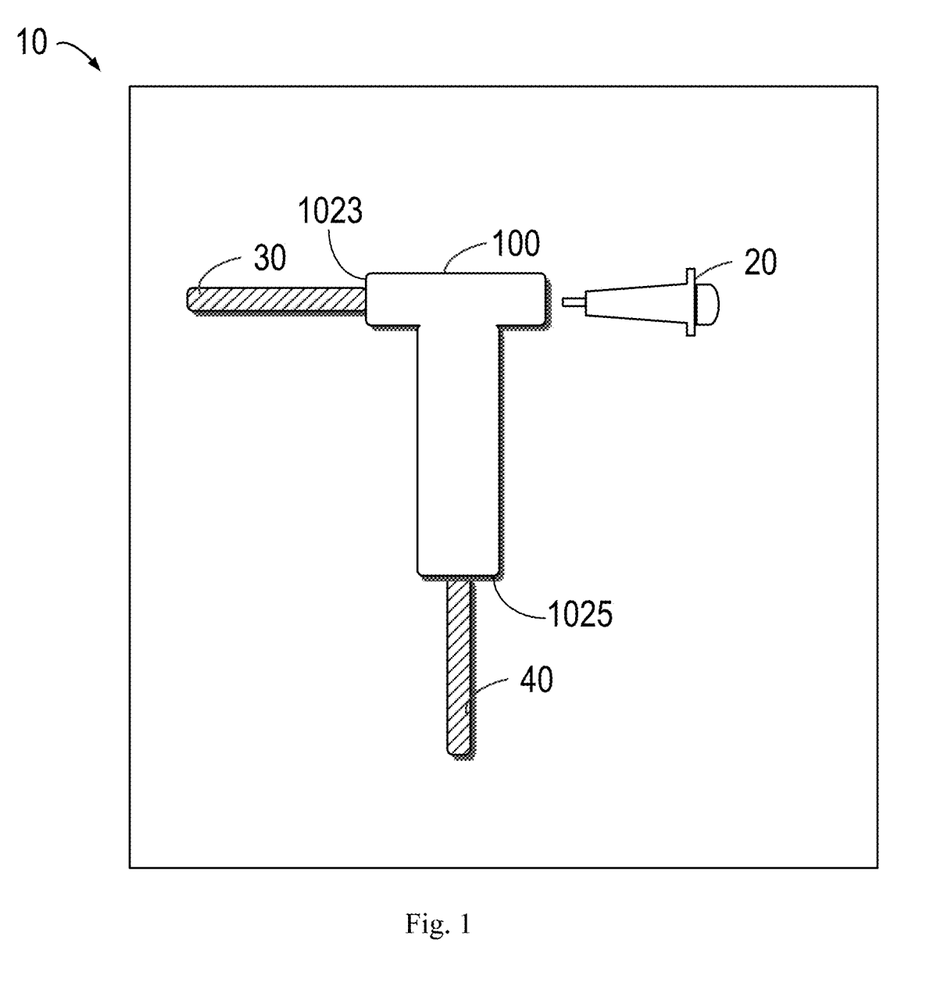
FIG. 1 illustrates a schematic diagram of a switchgear in accordance with some example embodiments of the present disclosure.

FIG. 1 illustrates a schematic diagram of switchgear 10 in accordance with some example embodiments of the present disclosure. The switchgear 10 includes, among other components, a power cable connector 100 and a basic insulating plug (BIP) 20. The power cable connector 100 generally includes terminals 1023, 1025 for connection. Cables 30 and 40 can be inserted into terminals 1023, 1025 of the power cable connector 100 for connection.

Figure 2:
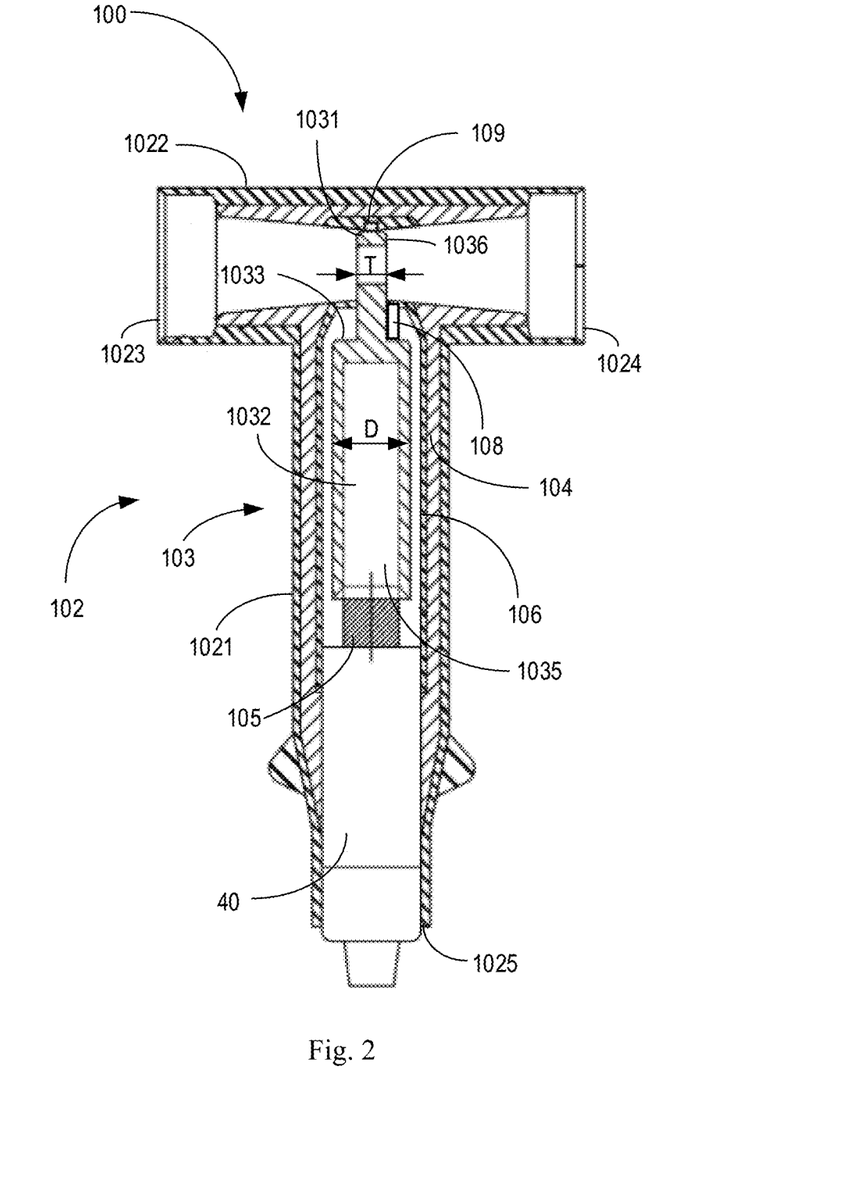
FIG. 2 illustrates a cross section view of a power cable connector in accordance with some example embodiments of the present disclosure.

FIG. 2 illustrates a cross section view of a power cable connector 100 in accordance with some example embodiments of the present disclosure. With reference to FIG. 2, the power cable connector 100 comprises a housing 102. The housing 102 comprises a first portion 1021. The first portion 1021 is adapted to contain a conductive plug 103. The conductive plug 103 is inserted through the first portion 1021.

The power cable connector 100 further comprises a first layer 104 and a second layer 106. As shown in FIG. 2, the first layer 104 is arranged on at least a part of an inner wall of the housing 102 and the second layer 106 is arranged on the first layer 104. The first layer 104 is at least partially located between the inner wall of the housing 102 and the second layer 106. As shown in FIG. 2, the power cable connector 100 also comprises a passive wireless measuring apparatus 108, which is embedded into the second layer 106. The passive wireless measuring apparatus 108 can be used for sensing temperature of the conductive plug 103. The passive wireless measuring apparatus 108 is a passive element that requires no wired connection for supplying power. As such, the passive wireless measuring apparatus 108 can be located conveniently at any place as necessary.

With this configuration, the major part of the passive wireless measuring apparatus 108 is buried in the second layer 106, while a surface of the passive wireless measuring apparatus 108 is exposed. When the conductive plug 103 is inserted into the first portion 1021, the exposed surface of the passive wireless measuring apparatus 108 can be coupled to the conductive plug 103.

According to embodiments of the present disclosure, upon coupling to the conductive plug 103, the passive wireless measuring apparatus 108 is capable of sensing the temperature of the conductive plug 103 in real time. In this way, by sensing the on-line temperature of the conductive plug 103, the failure possibility of cable accessories caused by temperature rising can be effectively prevented or reduced. Therefore, a fast reactive measurement can be achieved.

Moreover, due to the fact that the passive wireless measuring apparatus 108 requires no external power supply, the need of regular removal and recharging is eliminated. The power quality may be improved.

In some embodiments, the passive wireless measuring apparatus 108 may comprise a temperature sensor configured to measure a temperature of the conductive plug 103, an integrated circuit (IC) and an antenna. The IC (not shown) is coupled to the temperature sensor and configured to receive a signal indicative of the temperature from the temperature sensor. The electrical power can be supplied to the passive wireless measuring apparatus 108 via the antenna from an electromagnetic generation device.

In some embodiments, the conductive plug 103 may comprise a plate portion 1031 and a cylindrical portion 1032, as shown in FIG. 2. The plate portion 1031 has a first thickness T and the cylindrical portion 1032 has a first diameter D. The first thickness T is less than the first diameter D, thus a shoulder 1033 is formed on an end of the cylindrical portion 1032. The end is adjacent to the plate portion 1031. The passive wireless measuring apparatus 108 may be arranged on the shoulder 1033.

In this way, the passive wireless measuring apparatus 108 can be securely placed within the power cable connector 100, and the reliability of the passive wireless measuring apparatus 108 can be guaranteed. Moreover, by easily placing the passive wireless measuring apparatus 108 on the shoulder 1033, there is no need to significantly change the structure of the power cable connector 100. As such, the cost of the power cable connector 100 could be effectively controlled.

In other embodiments, the passive wireless measuring apparatus 108 can be fixed in other places than the shoulder 1033, as long as the location would not interfere with the operation of other components inside the power cable connector 100 and also enables good contact between the passive wireless measuring apparatus 108 and the conductive plug 103. For example, in alternative embodiments, the passive wireless measuring apparatus 108 can be fixed on the aperture end 1036 of the conductive plug 103. In other embodiments, the passive wireless measuring apparatus 108 can be fixed on the side of aperture end 1036 of the conductive plug 103.

In some embodiments, the passive wireless measuring apparatus 108 may be directly coupled to the second layer 106. In this way, the passive wireless measuring apparatus 108 may set up an electrical connection with the second layer easily.

Figure 3:
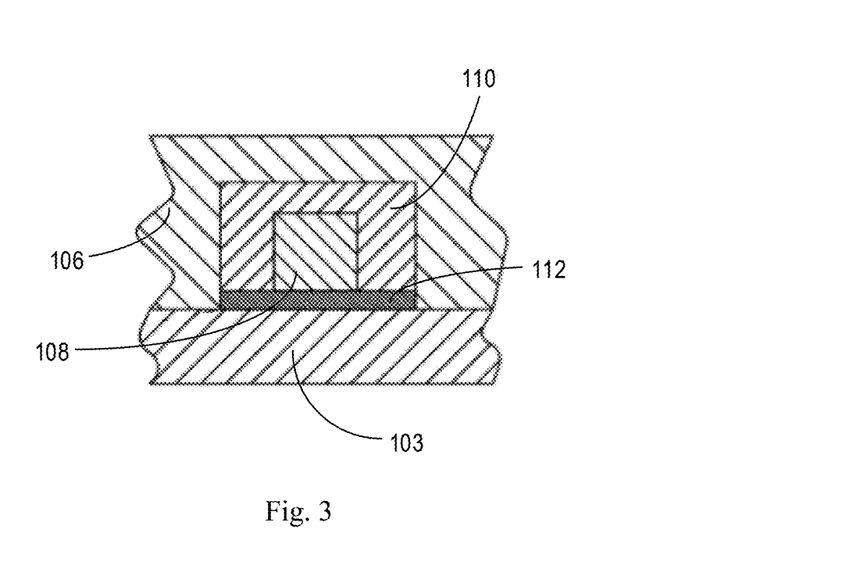
FIG. 3 illustrates a close-up view of a passive wireless measuring apparatus in accordance with some example embodiments of the present disclosure.

FIG. 3 illustrates a close-up view of a passive wireless measuring apparatus in accordance with some example embodiments of the present disclosure. As illustrated in FIG. 3, in some embodiments, the passive wireless measuring apparatus 108 may be coupled to the second layer 106 via a semi-conductive material 110. In this way, the possibility of partial discharge on an interface of the passive wireless measuring apparatus 108 and the second layer 106 may be reduced. Hence, the electrical field around the passive wireless measuring apparatus 108 may be made more uniform.

In some embodiments, the surface of the passive wireless measuring apparatus 108 may be directly coupled to the conductive plug 103. For example, the passive wireless measuring apparatus 108 can be fitted into a groove on the surface of the conductive plug 103. In this way, the temperature of the conductive plug 103 may be obtained by means of the passive wireless measuring apparatus 108 in a simpler and cheaper manner.

As illustrated in FIG. 3, in some embodiments, the surface of the passive wireless measuring apparatus 108 may be coupled to the conductive plug 103 by a thermal conductive material 112. In this way, the thermal conductive material 112 may establish a better thermal contact between the conductive plug 103 and the passive wireless measuring apparatus 108. Thus, the temperature deviation between the conductive plug 103 and the passive wireless measuring apparatus 108 may be smaller, and a more accurate measurement of the conductive plug 103 can be obtained.

In some embodiments, the semi-conductive material 110 may be selected from a group consisting of EPDM rubber, silicone rubber, acrylic resin, epoxy resin and combination thereof. It could be understood that that the material listed herein is only illustrative, rather than restrictive. The semi-conductive material 110 may be any material already known or to be developed in the future, e.g. TPE or other suitable materials, as long as the semi-conductive material 110 used to couple the passive wireless measuring apparatus 108 to the second layer 106 may create a more uniform electrical field around the passive wireless measuring apparatus 108.

In some embodiments, the thermal conductive material 112 may be selected from a group consisting of EPDM rubber, silicone rubber, acrylic resin, epoxy resin and combination thereof. It could be understood that the material mentioned herein is only for illustrative purpose. The thermal conductive material 112 may be any material already known or to be developed in the future, e.g. thermal silicone grease or other suitable materials, as long as the thermal conductive material 112 used to couple the surface of the passive wireless measuring apparatus 108 to the conductive plug 103 can reduce the temperature difference the conductive plug 103 and the passive wireless measuring apparatus 108 to ensure precise measurement of the conductive plug 103.

In some embodiments, the power cable connector 100 may comprise a further passive wireless measuring apparatus 109. The further passive wireless measuring apparatus 109 may be located in a different location than the passive wireless measuring apparatus 108. As mentioned above, the further passive wireless measuring apparatus 109 can be fixed on the aperture end 1036 of the conductive plug 103 or on the side of aperture end 1036 of the conductive plug 103. With more than one passive wireless measuring apparatus, a more accurate measurement of the temperature of the conductive plug 103 may be obtained by processing the measurement from the plurality of passive wireless measuring apparatus. For example, the temperature of the conductive plug 103 may be calculated by averaging the temperature data obtained from the passive wireless measuring apparatus 108, 109.

In case that the temperature distribution on the conductive plug 103 is not uniform, some specific portions of the conductive plug 103 may suffer a different temperature than the other regions of the conductive plug 103. In such an embodiment, providing a plurality of passive wireless measuring apparatus enables an on-line monitoring of the region of interest on the conductive plug 103.

Although two passive wireless measuring apparatus are shown in FIG. 2, it is to be understood that this is merely example without suggesting any limitation as to the scope of the present disclosure. Any other number of the passive wireless measuring apparatus may be also possible, for example, three, four and even more, which may depend on the demand of the user and the size of each passive wireless measuring apparatus.

In some embodiments, the conductive plug 103 may comprise an opening (not shown) at its end 1035. The opening may receive a conductor 105. The conductor 105 may be the conductor of a cable 40, as illustrated in FIG. 2. In this way, the cable 40 can be coupled to the power cable connector 100 in a simple manner. Hence, as the conductor 105 couples with the conductive plug 103, the temperature of the conductor 105 may be monitored in real time to prevent overheat of the conductor 105.

In some embodiments, the housing 102 may be made of a semi-conductive material. Specifically, the housing 102 may be made of various semi-conductive materials, such as epoxy resin, silicone rubber as well as other suitable materials, depending on individual requirement. In this way, it can be ensured that the housing 102 is in grounded state.

In some embodiments, the first layer 104 may be made of an insulation material. In this way, a fine insulation performance may be achieved. Specifically, the first layer 104 may be made of various insulation materials, such as silicone as well as other materials, depending on individual requirement.

In some embodiments, the second layer 106 may be made of a semi-conductive material. Specifically, the second layer 106 may be made of various semi-conductive materials, such as epoxy resin, silicone rubber as well as other materials, depending on individual requirement. In this way, the electric field stress may be effectively controlled.

The second layer 106 may be made of the same material with that of the housing 102. Of course, the second layer 106 may be made of different material than that of the housing 102. The specific materials are not limited by embodiments of the present disclosure.

In some embodiments, the conductive plug 103 may be made of metal. For example, the conductive plug 103 may be a conventional solid conductive plug, which may be made of a metal material, such as copper, aluminum and so on. In this way, a better conductivity may be ensured.

In some embodiments, the power cable connector 100 may further comprise a second portion 1022. As shown in FIG. 2, the first portion 1021 comprises an end connected to the second portion 1022 so that the first and second portions 1021, 1022 form a "T" shape.

As shown in FIG. 2, the end of the first portion 1021 is connected to the second portion 1022 at the middle of the first portion 1021. It is to be understood that this configuration is merely an example without suggesting any limitation as to the scope of the present disclosure. The end of the first portion 1021 may be connected to the second portion 1022 at other locations rather than the middle of the first portion 1021. For example, the end of the first portion 1021 may be connected to the second portion 1022 at a location adjacent to the left terminal 1023 of the first portion 1021. In an alternative embodiment, the end of the first portion 1021 may be connected to the second portion 1022 at a location adjacent to the right terminal 1024 of the first portion 1021. The specific location is not limited by embodiments of the present disclosure, as long as the first portion 1021 and the second portion 1022 may form a "T" shape.

Alternatively, similar to the first portion 1021, the second portion 1022 may also include a housing, a first layer, and a second layer. In some embodiments, the housing of the second portion 1022 may share the same material with the housing 102 of the first portion 1021. In alternative embodiment, the first layer of the second portion 1022 may share the same material with the first layer 104 of the first portion 1021. In alternative embodiment, the second layer of the second portion 1022 may share the same material with the second layer 106 of the first portion 1021.

In some embodiments, the passive wireless measuring apparatus 108 may comprise a radio frequency identification (RFID) tag. In this way, the temperature of the conductive plug 103 can be obtained in a reliable manner. It is to be understood that the passive wireless measuring apparatus 108 may comprise other suitable apparatus rather than the RFID tag, e.g. a surface acoustic wave (SAW) sensor, depending on individual requirement from the user.

Referring back to FIG. 1, although only one power cable connector 100 and one BIP 20 are shown in FIG. 1, it could be understood that the switchgear 10 may include a plurality of power cable connectors and a plurality of BIPs. Also, it could be understood that the power cable connector could be used for other BIPs, and the numbers of the power cable connectors and the BIPs could be different in the switchgear 10.

Figure 4:
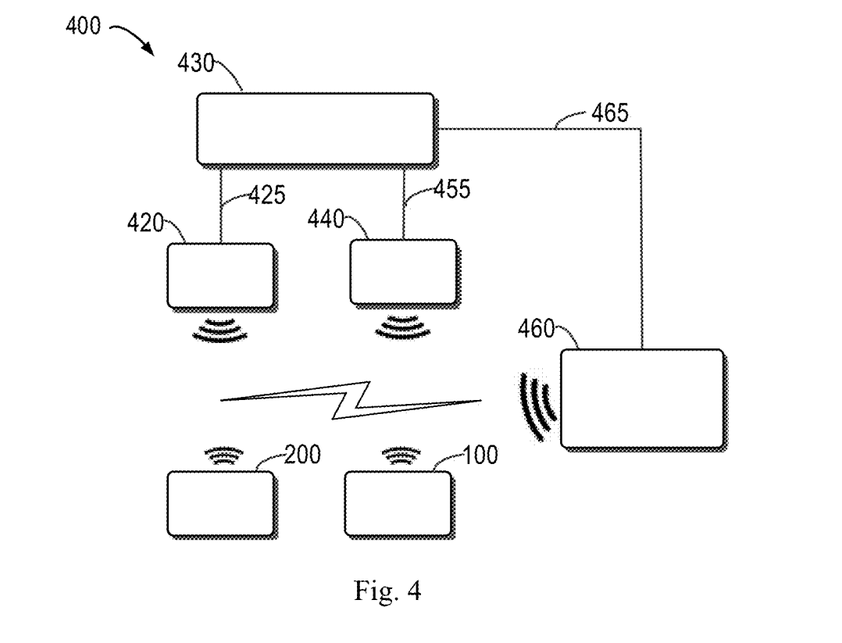
FIG. 4 illustrates an electric system in accordance with some example embodiments of the present disclosure.

FIG. 4 illustrates an electric system 400 in accordance with some example embodiments of the present disclosure. As shown, the system 400 comprises a power cable connector 100. The system 400 further comprises a first antenna 420 and a reader 430 coupled to the first antenna 420, and the reader 430 is configured to provide wireless radio frequency energy to power the passive wireless measuring apparatus 108 in the power cable connector 100 via the first antenna 420. The power cable connector 100 comprises a temperature sensor configured to measure a temperature of the conductive plug 103 and a passive wireless communication module configured to transmit the measured temperature.

Referring to FIG. 1 again, in some embodiments, the power cable connector 100 is configured to fit into a basic insulating plug 20 of a switchgear 10.

In some embodiments, the power cable connector 100 may be arranged on a cable accessory cabinet of a switchgear 10, and the first antenna 420 may be arranged on a side wall or a top wall of the cable accessory cabinet so that the wireless communication between the power cable connector 100 and the first antenna 420 can be enhanced.

In some embodiments, the system 400 may further comprise a further power cable connector 200, which also may be the power cable connector 100 as discussed above. In some embodiments, the system 400 may further comprise a second antenna 440. In some embodiments, the first antenna 420 may be arranged towards the power cable connector 100 while the second antenna 440 may be arranged towards the power cable connector 200. Moreover, the system 400 may further comprise an antenna 460, which may be arranged on a front door of a cable accessory cabinet of the switchgear. The antenna 460 may be a larger antenna and can provide wireless radio frequency energy to power all the temperature sensors in the system 400.

According to embodiments of the present disclosure, the temperature sensors in power cable connectors 100 and 200 can use the received radio frequency energy to work so as to obtain the temperatures of the power cable connectors. The antennas 420 and 440 are connected to the reader 430 via the lines 425, 455 such as a coaxial cable configured to receive the measured temperatures from the power cable connectors 100 and 200. Moreover, the antenna 460 may be connected to the reader 430 via the line 465. For example, the antenna 460 may be arranged on a front door of a cable accessory cabinet of the switchgear.

For example, the reader 430 may ask all temperature sensors in the power cable connectors 100, 200 for electronic product codes (EPCs), the temperature sensors in the power cable connectors 100, 200 return the EPCs to the reader 430 and start to work. Next, the reader 430 starts to obtain temperatures from the temperature sensors of power cable connectors 100, 200, and each temperature sensor returns the temperature to the reader 430 in real time.

In some embodiments, the antennas and the reader may be tuned so that the power, frequency, direction and so on may be optimal for operations of the temperature sensors in the power cable connectors to have good communication quality.

It is to be understood that although two power cable connectors 100, 200 are shown in FIG. 4, the system 400 may include less or more power cable connectors. Moreover, to improve the communication quality in the case of a large amount of temperature sensors, more antennas located at different locations may be provided in the system 400.

In some embodiments, the temperature sensors in the power cable connector of the present disclosure can be used to measure temperature of the power cable connector. The temperature sensors in the power cable connector of the present disclosure can be used to measure temperature of other devices at which the power cable connector is located and having good thermal communication with the power cable connector, according to embodiments of the present disclosure, and thus temperature changes at different locations can be also monitored quickly and accurately.

By use of the power cable connector according to embodiments of present disclosure, the temperature of the power cable connector can be measured wirelessly and passively. In this way, the proposed system can provide a convenient and efficient way to measure the temperature of the power cable connector.

In some embodiments, the electric system 400 may be deployed as an Internet-of-Things (IoT) system. In the system 400, the reader 430 is connected to a system in a wired or wireless way for on-line monitoring of temperature of conductive plugs 103, and transmits temperature data collected by the temperature sensors of the power cable connectors 100 to the system 400 for on-line monitoring.

Figure 5:
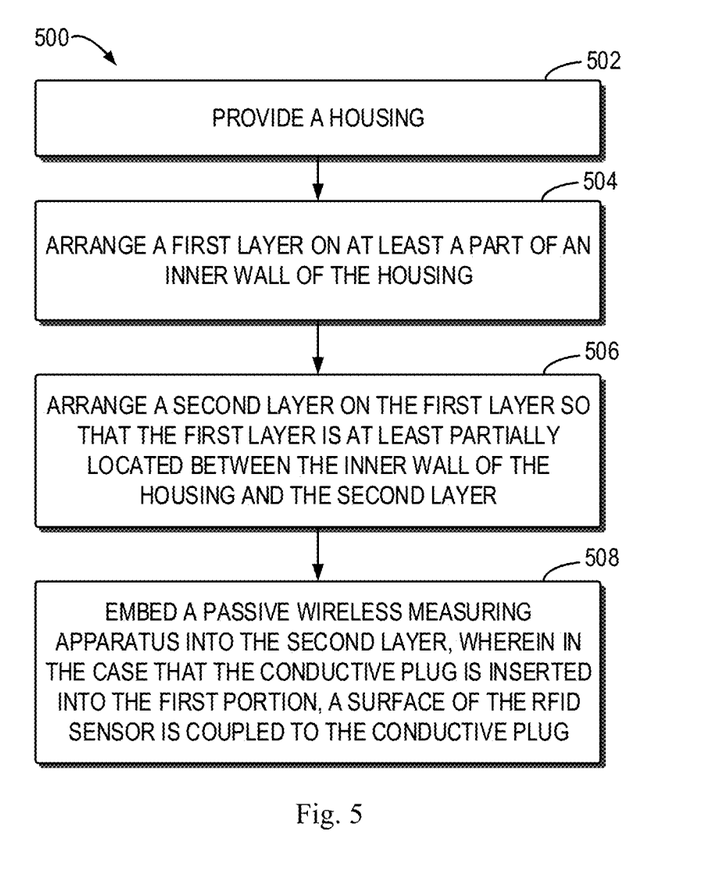
FIG. 5 illustrates a method for assembling a power cable connector in accordance with some example embodiments of the present disclosure.

FIG. 5 illustrates a method 500 for assembling a power cable connector 100 in accordance with some example embodiments of the present disclosure. In some embodiments, the method 500 can be executed manually. In some embodiments, the method 500 can be executed automatically. For example, the method 500 can be executed by a robot in a production line.

At block 502, a housing 102 is provided. The housing 102 comprises a first portion 1021 adapted to contain a conductive plug 103 inserted therethrough. At block 504, a first layer 104 is arranged on at least a part of an inner wall of the housing 102. At block 506, a second layer 106 is arranged on the first layer 104 so that the first layer 104 is at least partially located between the inner wall of the housing 102 and the second layer 106. At block 508, a passive wireless measuring apparatus 108 is embedded into the second layer 106, wherein in the case that the conductive plug 103 is inserted into the first portion 1021, a surface of the passive wireless measuring apparatus 108 is coupled to the conductive plug 103.

It is to be understood that the apparatus, the structure or the process involved in FIG. 5 have been described above with reference to FIGS. 1-4, and the details will not be described hereinafter for the sake of brevity.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An electrical system, comprising:
a power cable connector comprising:
 a housing comprising a first portion adapted to contain a conductive plug when inserted therethrough;
 a first layer arranged on at least a part of an inner wall of the housing;
 a second layer arranged on the first layer so that the first layer is at least partially located between the inner wall of the housing and the second layer; and
 a passive wireless measuring apparatus embedded into the second layer of the housing, wherein only in the case when the conductive plug is inserted into the first portion, a surface of the passive wireless measuring apparatus is coupled to the conductive plug;
a first antenna; and
a reader coupled to the first antenna, wherein the reader is configured to provide wireless radio frequency energy to power the passive wireless measuring apparatus in the power cable connector and receiving temperature data via the first antenna.

2. The electrical system of claim 1, wherein the conductive plug comprises a plate portion and a cylindrical portion, a first thickness of the plate portion being less than a first diameter of the cylindrical portion to form a shoulder on an end of the cylindrical portion adjacent to the plate portion.

3. The electrical system of claim 1, wherein the passive wireless measuring apparatus is coupled to the second layer via a semi-conductive material.

4. The electrical system of claim 3, wherein the semi-conductive material is selected from a group consisting of EPDM rubber, silicone rubber, acrylic resin, epoxy resin and combination thereof.

5. The electrical system of claim 1, further comprising:
a further passive wireless measuring apparatus embedded into the second layer of the housing.

6. The electrical system of claim 1, wherein the conductive plug comprises an opening at an end thereof for receiving a conductor.

7. The electrical system of claim 1, wherein the housing is made of a semi-conductive material.

8. The electrical system of claim 1, wherein the first layer is made of an insulation material.

9. The electrical system of claim 1, wherein the second layer is made of a semi-conductive material.

10. The electrical system of claim 1, wherein the conductive plug is made of metal.

11. The electrical system of claim 1, further comprising:
a second portion, wherein the first portion comprises an end connected to the second portion so that the first and second portions form a "T" shape.

12. The electrical system of claim 1, wherein the passive wireless measuring apparatus comprises a radio frequency identification (RFID) tag.

13. The electric system according to claim 1, wherein the power cable connector is configured to fit into a basic insulating plug of a switchgear.

14. The electric system according to claim 1, further comprising:
a further power cable connector of comprising:
a second housing comprising a first portion adapted to contain a conductive plug when inserted therethrough;
a first layer arranged on at least a part of an inner wall of the second housing, the first layer is made of an insulation material;
a second layer arranged on the first layer so that the first layer is at least partially located between the inner wall of the second housing and the second layer; and
a second passive wireless measuring apparatus embedded into the second layer of the second housing, wherein only in the case when the conductive plug is inserted into the first portion, a surface of the second passive wireless measuring apparatus is coupled to the conductive plug.

15. The electric system according to claim 14, further comprising:
a second antenna coupled to the reader, and configured to match an antenna of the further power cable connector.

16. An Internet of Things system comprising: a power cable connector of claim 1.

17. The electrical system of claim 1, wherein the passive wireless measuring apparatus is directly coupled to the second layer.

18. An electrical system, comprising:
a power cable connector comprising:
a housing comprising a first portion adapted to contain a conductive plug when inserted therethrough;
a first layer arranged on at least a part of an inner wall of the housing;
a second layer arranged on the first layer so that the first layer is at least partially located between the inner wall of the housing and the second layer; and
a passive wireless measuring apparatus embedded into the second layer of the housing, wherein only in the case when the conductive plug is inserted into the first portion, a surface of the passive wireless measuring apparatus is coupled to the conductive plug by a thermal conductive material disposed over the passive wireless measuring apparatus;
a first antenna; and
a reader coupled to the first antenna, wherein the reader is configured to provide wireless radio frequency energy to power the passive wireless measuring apparatus in the power cable connector and receiving temperature data via the first antenna.

19. An electrical system, comprising:
a power cable connector comprising:
a housing comprising a first portion adapted to contain a conductive plug when inserted therethrough;
a first layer arranged on at least a part of an inner wall of the housing;
a second layer arranged on the first layer so that the first layer is at least partially located between the inner wall of the housing and the second layer; and
a passive wireless measuring apparatus embedded into the second layer of the housing, wherein only in the case when the conductive plug is inserted into the first portion, a surface of the passive wireless measuring apparatus is coupled to the conductive plug by a thermal conductive material disposed over the passive wireless measuring apparatus, the thermal conductive material being selected from a group consisting of EPDM rubber, silicone rubber, acrylic resin, epoxy resin and combination thereof, the passive wireless measuring apparatus comprising a radio frequency identification (RFID) tag;
a first antenna; and
a reader coupled to the first antenna, wherein the reader is configured to provide wireless radio frequency energy to power the passive wireless measuring apparatus in the power cable connector and receiving temperature data via the first antenna.

\* \* \* \* \*